US012567040B2

(12) United States Patent
Punzalan et al.

(10) Patent No.: US 12,567,040 B2
(45) Date of Patent: *Mar. 3, 2026

(54) ONBOARDING SYSTEM WITH GRAPHICAL USER INTERFACE

(71) Applicant: ADP, Inc., Roseland, NJ (US)

(72) Inventors: Roel Punzalan, Pasadena, CA (US); Katherine Lewis, Pasadena, CA (US)

(73) Assignee: ADP, Inc., Roseland, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/752,360

(22) Filed: Jun. 24, 2024

(65) Prior Publication Data

US 2025/0061425 A1 Feb. 20, 2025

Related U.S. Application Data

(63) Continuation of application No. 17/450,603, filed on Oct. 12, 2021, now Pat. No. 12,020,212.

(51) Int. Cl.
G06Q 10/1053 (2023.01)
G06F 3/0482 (2013.01)
G06F 3/0483 (2013.01)

(52) U.S. Cl.
CPC ....... *G06Q 10/1053* (2013.01); *G06F 3/0482* (2013.01); *G06F 3/0483* (2013.01)

(58) Field of Classification Search
CPC .. G06Q 10/1053; G06F 3/0482; G06F 3/0483
See application file for complete search history.

(56) References Cited

U.S. PATENT DOCUMENTS

| | | | |
|---|---|---|---|
| 8,234,187 B1 * | 7/2012 | Martin | G06Q 20/40 705/320 |
| 11,354,714 B1 | 6/2022 | Basta et al. | |
| 2020/0034206 A1 | 1/2020 | Dimitrov et al. | |

FOREIGN PATENT DOCUMENTS

WO WO-2015/057050 A1 4/2015

OTHER PUBLICATIONS

MiniOrange, "Streamlined Access Management: User Provisioning & Deprovisioning with Automated Provisioning," Jul. 28, 2021, published on YouTube.com, available at https://www.youtube.com/watch?v=No8cg_qMrR4, video (8 minutes and 44 seconds). (Year: 2021).

(Continued)

*Primary Examiner* — Dino Kujundzic
(74) *Attorney, Agent, or Firm* — Foley & Lardner LLP

(57) ABSTRACT

A method, apparatus, system, and computer program code for onboarding client information for provisioning multiple software services. On a first page of the graphical user interface, client location data is received in a consolidated manner for the multiple services. Within the first page of the graphical user interface, each of the multiple software services is configured using a plurality of guided question. The client location data is organized according to Federal Employer Identification Number. Groups of client location data, organized per FEIN, are displayed on a second page of the graphical user interface, providing an easier onboarding process that reduces no-starts and enables a client to onboard services more quickly and accurately.

18 Claims, 7 Drawing Sheets

(56) References Cited

OTHER PUBLICATIONS

US Notice of Allowance issued in corresponding U.S. Appl. No. 17/450,603, dated Feb. 20, 2024 (10 pages).
US Office Action issued in corresponding U.S. Appl. No. 17/450,603, dated Oct. 5, 2023 (16 pages).

* cited by examiner

ONBOARDING
ENVIRONMENT
200

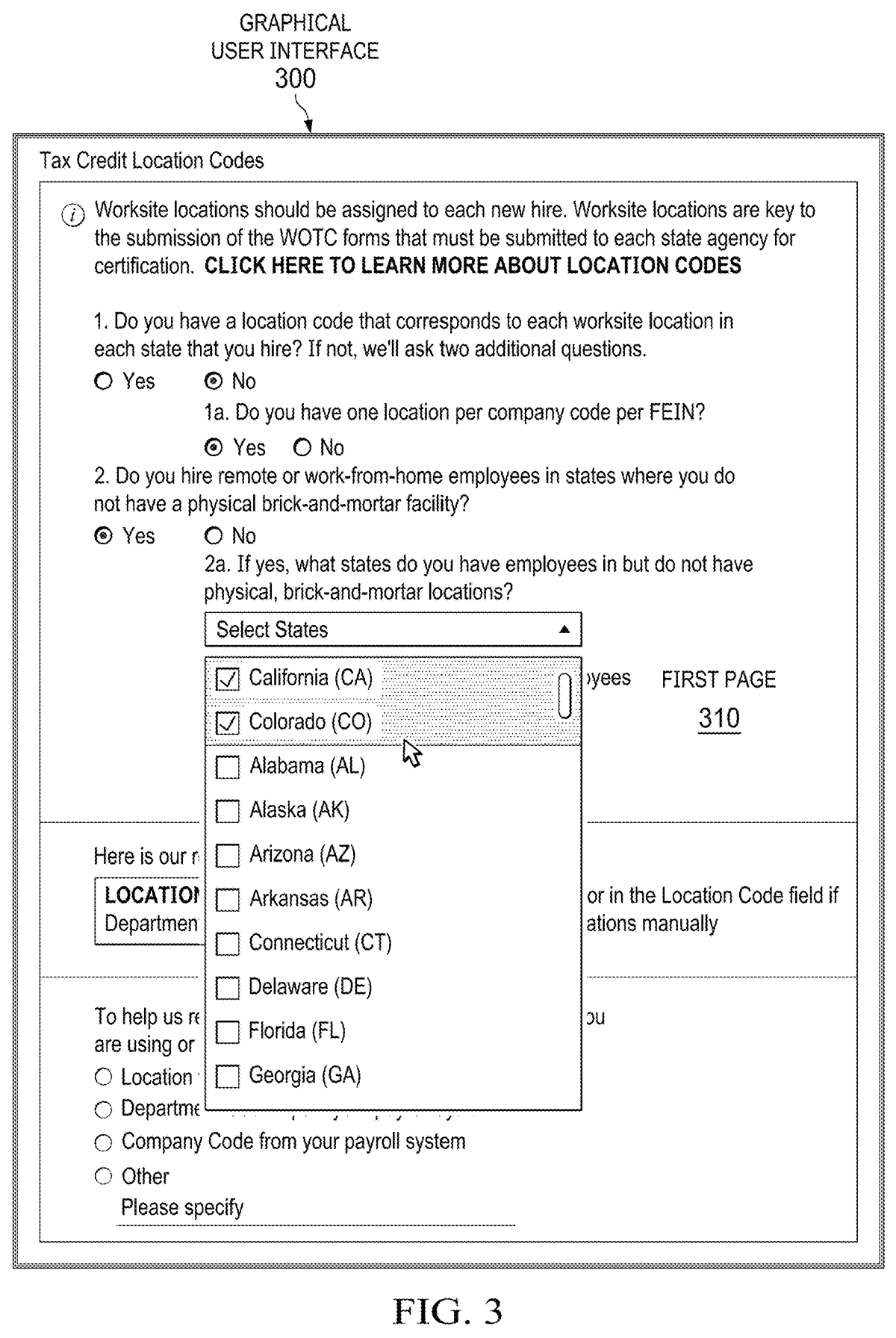

GRAPHICAL
USER INTERFACE
300

Tax Credit Location Codes (i) Worksite locations should be assigned to each new hire. Worksite locations are key to the submission of the WOTC forms that must be submitted to each state agency for certification. CLICK HERE TO LEARN MORE ABOUT LOCATION CODES

1. Do you have a location code that corresponds to each worksite location in each state that you hire? If not, we'll ask two additional questions.

○ Yes    ◉ No

1a. Do you have one location per company code per FEIN?

◉ Yes   ○ No

2. Do you hire remote or work-from-home employees in states where you do not have a physical brick-and-mortar facility?

◉ Yes    ○ No

2a. If yes, what states do you have employees in but do not have physical, brick-and-mortar locations?

| Select States      ▲ |
| --- |
| ☑ California (CA) |
| ☑ Colorado (CO) |
| ☐ Alabama (AL) |
| ☐ Alaska (AK) |
| ☐ Arizona (AZ) |
| ☐ Arkansas (AR) |
| ☐ Connecticut (CT) |
| ☐ Delaware (DE) |
| ☐ Florida (FL) |
| ☐ Georgia (GA) |

)yees    FIRST PAGE
310

Here is our r

LOCATION
Departmen or in the Location Code field if ations manually

To help us re
are using or

○ Location
○ Departme
○ Company Code from your payroll system
○ Other
    Please specify bu

FIG. 3

Locations Within Each FEIN

Parent Company/FEIN [ Company 1, Inc. ▼ ]    SECOND PAGE 410    🗑 DELETE

⇧ MOVE    ⊜ DELETE    89 Locations

| ☐ | LOCATION NAME ⬍ SERVICES | LOCATION ADDRESS | LOCATION CODE ⑦ | CONTACT NAME ⬍ | CONTACT EMAIL PHONE NUMBER | |
|---|---|---|---|---|---|---|
| ☐ | Bellhampton 01 Tax Credits, Wisely | 1234 Street St. Ste. 101 Bellhampton, NV 84501 | 000-01 | Pamela Radcliff | pamradcliff@easternauto.com 304-893-9040 | ✎ |
| ☐ | Bellhampton 02 Tax Credits, Wisely | 1234 Street St. Ste. 101 Bellhampton, NV 84501 | 000-02 | Todd Chavez | tchavez@easternauto.com 304-893-9040 | ✎ |
| ☐ | Carborro Tax Credits | 1234 Street St. Ste. 101 Bellhampton, NV 84501 | 000-03 | ⋮ | ⋮ ⋮ | ✎ |
| ☐ | Derby Lane Wisely | 1234 Street St. Ste. 101 Bellhampton, NV 84501 | ⋮ | Bojack Horseman | bojack@easternauto.com 304-893-9040 | ✎ |
| ☐ | Hillside 01 | 1234 Street St. Ste. 101 | 000-05 | Vincent Adultman | vincentadultman@easternauto... | ✎ |

⊕ MANUALLY ADD LOCATION    89 Items Found | Items Per Page [ 5 ▼ ]    ◁ ◁ [ 1 ] of 18 ▷ ▷

Parent Company/FEIN [ The Second Company ▼ ]    🗑 DELETE

GRAPHICAL USER INTERFACE

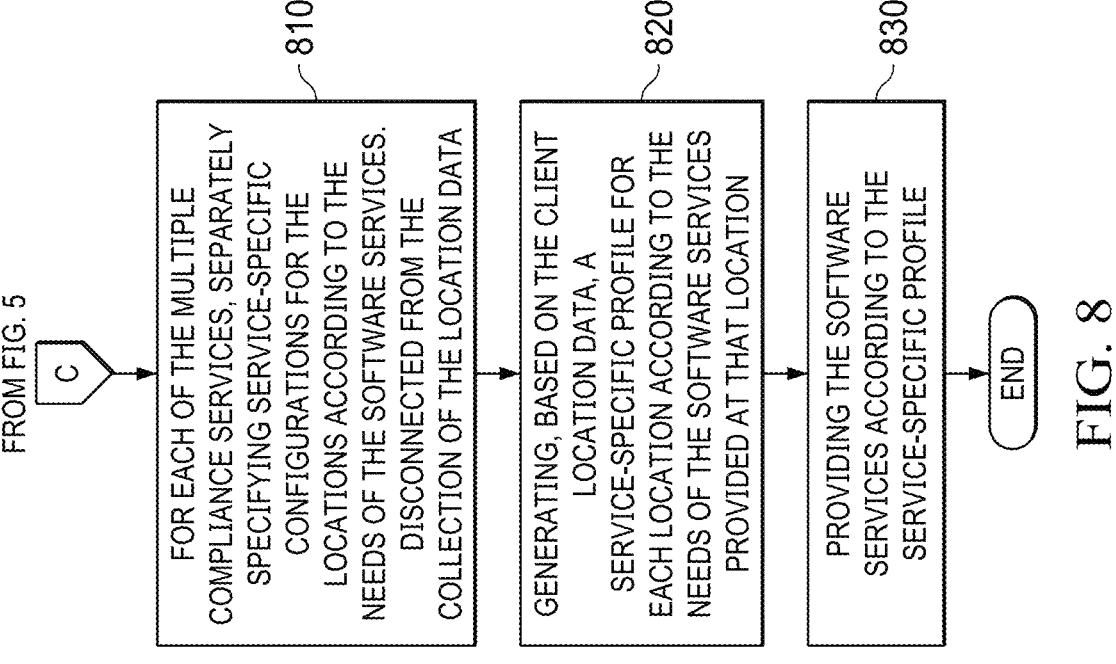

FROM FIG. 5

C

810
FOR EACH OF THE MULTIPLE COMPLIANCE SERVICES, SEPARATELY SPECIFYING SERVICE-SPECIFIC CONFIGURATIONS FOR THE LOCATIONS ACCORDING TO THE NEEDS OF THE SOFTWARE SERVICES, DISCONNECTED FROM THE COLLECTION OF THE LOCATION DATA

820
GENERATING, BASED ON THE CLIENT LOCATION DATA, A SERVICE-SPECIFIC PROFILE FOR EACH LOCATION ACCORDING TO THE NEEDS OF THE SOFTWARE SERVICES PROVIDED AT THAT LOCATION

830
PROVIDING THE SOFTWARE SERVICES ACCORDING TO THE SERVICE-SPECIFIC PROFILE

END

FIG. 8

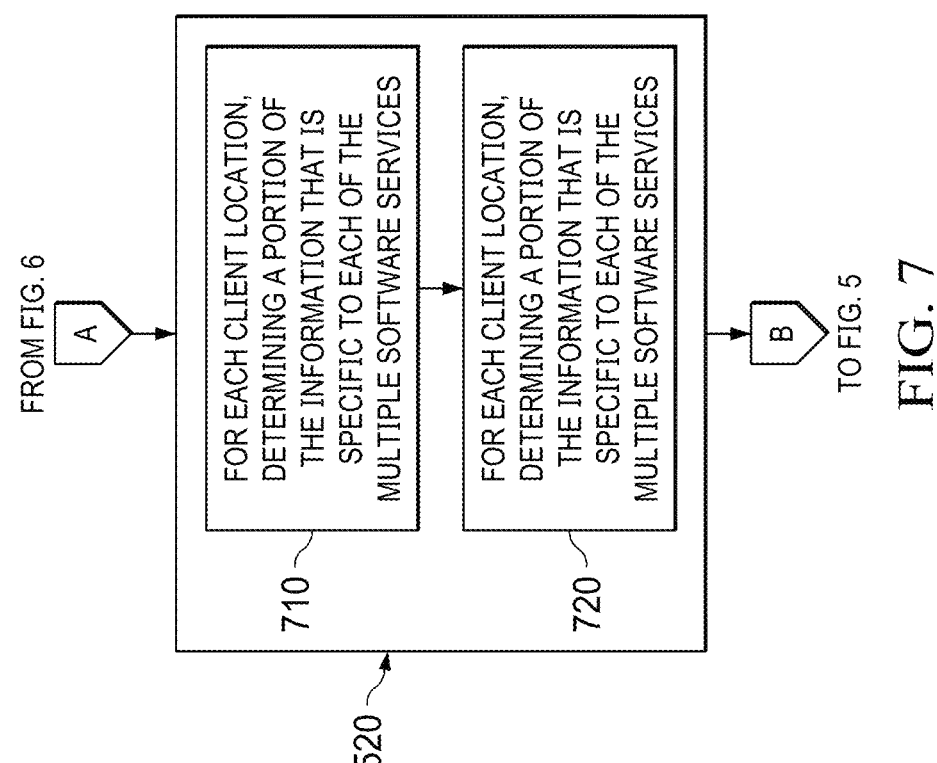

FROM FIG. 6

A

520

710
FOR EACH CLIENT LOCATION, DETERMINING A PORTION OF THE INFORMATION THAT IS SPECIFIC TO EACH OF THE MULTIPLE SOFTWARE SERVICES

720
FOR EACH CLIENT LOCATION, DETERMINING A PORTION OF THE INFORMATION THAT IS SPECIFIC TO EACH OF THE MULTIPLE SOFTWARE SERVICES

ONBOARDING SYSTEM WITH GRAPHICAL USER INTERFACE

1. CROSS-REFERENCE TO RELATED APPLICATION

This application claims the benefit of priority under 35 U.S.C. § 120 as a continuation of Ser. No. 17/450,603, filed Oct. 12, 2021, which is hereby incorporated by reference herein in its entirety.

2. FIELD

The disclosure relates generally to an improved computer system and, more specifically, to a method, apparatus, computer system, and computer program product for onboarding client information for provisioning multiple software services.

3. DESCRIPTION OF THE RELATED ART

Increasingly, businesses are offering software as a service to clients. Clients typically access these services via the Internet. Often there exists no unified management of a client's profile across multiple services offered by a provider. For example, a business may purchase a suite of services from a single provider. Such services may include tax preparation, payroll management, human resources management, employment tax, wage garnishment, unemployment claims, tax credits, health compliance, employment verification, W2 management, wage payments, and possibly many others.

However, because there is no unified management of the client's profile across these services, problems can arise. For example, changes to the client profile resulting from, among other reasons, name changes, address changes, and other profile changes may not propagate to the various different client profiles of the different services offered to the client. In still another example, possibly months of time may be needed to prepare a large client to develop all the different client profiles for the different services. In some cases, the client may be asked to provide the same information multiple times in different formats to subscribe to each individual service. As a result, not only is unnecessary duplication an issue, but when information needs to be updated it must be updated across all of the profiles for the different services. Accordingly, data out-of-sync errors can arise, which could result in penalties and interest in the case of tax entities not receiving timely information.

In another example, some services may require a client's business locations that will use these services to determine service eligibility, such as employment tax and certain tax credits. These business locations would need to be organized within each of their Federal Employer Identification Numbers (FEINs), as well as indicating which services are used at what locations. In a traditional onboarding experience, clients would provide Location information in a spreadsheet. Each location would take up one row of the spreadsheet, and Federal Employer Identification Number (FEIN) information would need to be repeated for locations that belonged to the same FEIN. Location information would be collected separately for the different services, regardless of whether they were all the same locations, shared some locations while others differed, or if all locations for the services were different. Moreover, configurations of the client locations would be separately stored and managed, according to the needs of the individual services, disconnected from the collection of the location data itself.

SUMMARY

According to one embodiment of the present invention, a method in a graphical user interface is provided for onboarding client information for provisioning multiple software services. On a first page of the graphical user interface, client location data is received in a consolidated manner for the multiple services. Within the first page of the graphical user interface, each of the multiple software services is configured using a plurality of guided questions. The client location data is organized according to Federal Employer Identification Number. Groups of client location data, organized per FEIN, are displayed on a second page of the graphical user interface, providing an easier onboarding process that reduces no-starts and enables a client to onboard services more quickly and accurately.

According to another embodiment of the present invention, the computer system is provided for onboarding client information for provisioning multiple software services. The computer system includes a hardware processor, an onboarding service, and a graphical user interface. The onboarding service receives client location data for the multiple software services in a consolidated manner from a first page of the graphical user interface. The onboarding service displays a plurality of guided questions within the first page of the graphical user interface and configures each of the multiple software services according to client location data received in response to the guided questions. The onboarding service organizes the client location data per FEIN, and displays groups of client location data, organized per FEIN, on a second page of the graphical user interface, providing an easier onboarding process that reduces no-starts and enables a client to onboard services more quickly and accurately.

According to yet another embodiment of the present invention, a computer program product for onboarding client information for provisioning multiple software services comprises a computer-readable-storage media with program code stored on the computer-readable storage media. The program code includes code for receiving client location data for the multiple software services in a consolidated manner from a first page of the graphical user interface. The program code includes code for displaying a plurality of guided questions within the first page of the graphical user interface, and code for configuring each of the multiple software services according to client location data received in response to the guided questions. The program code includes code for organizing the client location data per FEIN, and code for displaying groups of client location data, organized per FEIN, on a second page of the graphical user interface, providing an easier onboarding process that reduces no-starts and enables a client to onboard services more quickly and accurately.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 3, a graphical user interface is depicted in which an onboarding service is depicted in accordance with an illustrative embodiment;

FIG. 4, a graphical user interface is depicted in which an onboarding service is depicted in accordance with an illustrative embodiment;

FIG. 7, a flowchart of a process for configuring, each of the multiple software services is depicted in accordance with an illustrative embodiment;

FIG. 8, a flowchart of a process for providing the software services is depicted in accordance with an illustrative embodiment.

DETAILED DESCRIPTION

The illustrative embodiments recognize and take into account one or more different considerations. For example, the illustrative embodiments recognize and take into account that current onboarding systems do not collect and display client information in a consolidated manner. online experiences, in the context of onboarding a client for software services, do not display different client locations, such as stores, organized per FEIN as collection of location data.

Thus, the illustrative embodiments recognize and take into account that it would be desirable to have a method, apparatus, computer system, and computer program product that takes into account the issues discussed above as well as other possible issues. For example, it would be desirable to have a method, apparatus, computer system, and computer program product that displays client information in a more organized manner that is easier to input and review, in a manner that allows information to be collected faster while also preventing errors in data entry.

In one illustrative example, a computer system is provided for onboarding client information for provisioning multiple software services. The computer system includes a hardware processor, an onboarding service, and a graphical user interface. The onboarding service receives client location data for the multiple software services in a consolidated manner from a first page of the graphical user interface. The onboarding service displays a plurality of guided questions within the first page of the graphical user interface and configures each of the multiple software services according to client location data received in response to the guided questions. The onboarding service organizes the client location data per FEIN, and displays groups of client location data, organized per FEIN, on a second page of the graphical user interface, providing an easier onboarding process that reduces no-starts and enables a client to onboard services more quickly and accurately.

Figure 1:
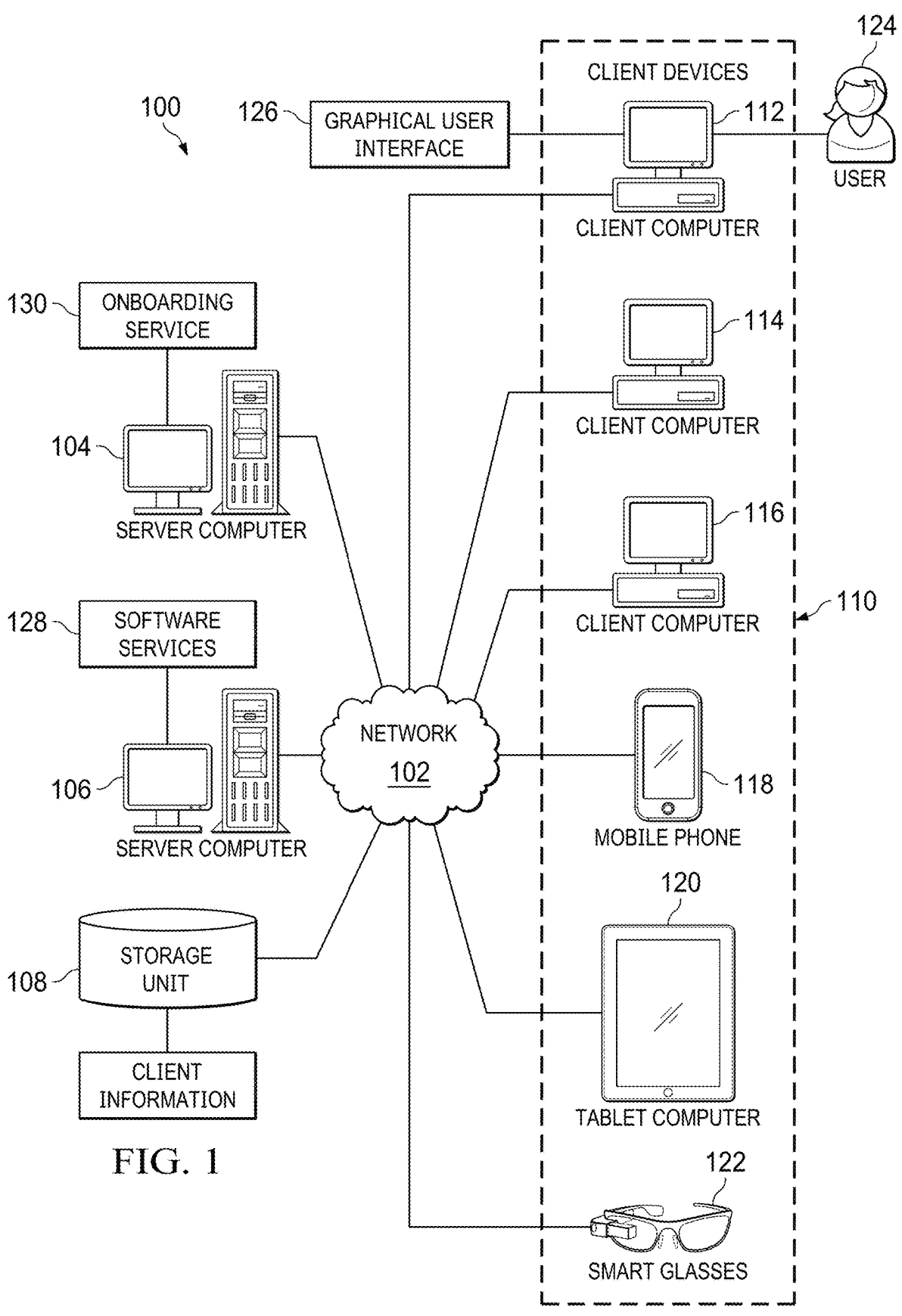
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage media and downloaded to a data processing system or other device for use. For example, the program code can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, a "number of," when used with reference to items, means one or more items. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In the illustrative example, user 124 operates client computer 112. As depicted, graphical user interface 126 of an application runs on client computer 114. User 124 can onboard and configure one or more software services 128 by accessing onboarding service 130 through graphical user interface 126.

In this illustrative example, onboarding service 130 can run on server computer 104. In another illustrative example, onboarding service 130 can be run in a remote location such as on client computer 114 and can take the form of a system instance of the application. In yet other illustrative examples, onboarding service 130 can be distributed in multiple locations within network data processing system 100. For example, onboarding service 130 can run on client computer 112 and on client computer 114 or on client computer 112 and server computer 104 depending on the particular implementation.

In conjunction with graphical user interface 126, onboarding service 130 can operate to collect client location data for multiple services in a consolidated manner, providing an easier onboarding process that reduces no-starts and enables a client to onboard services more quickly and accurately.

Figure 2:
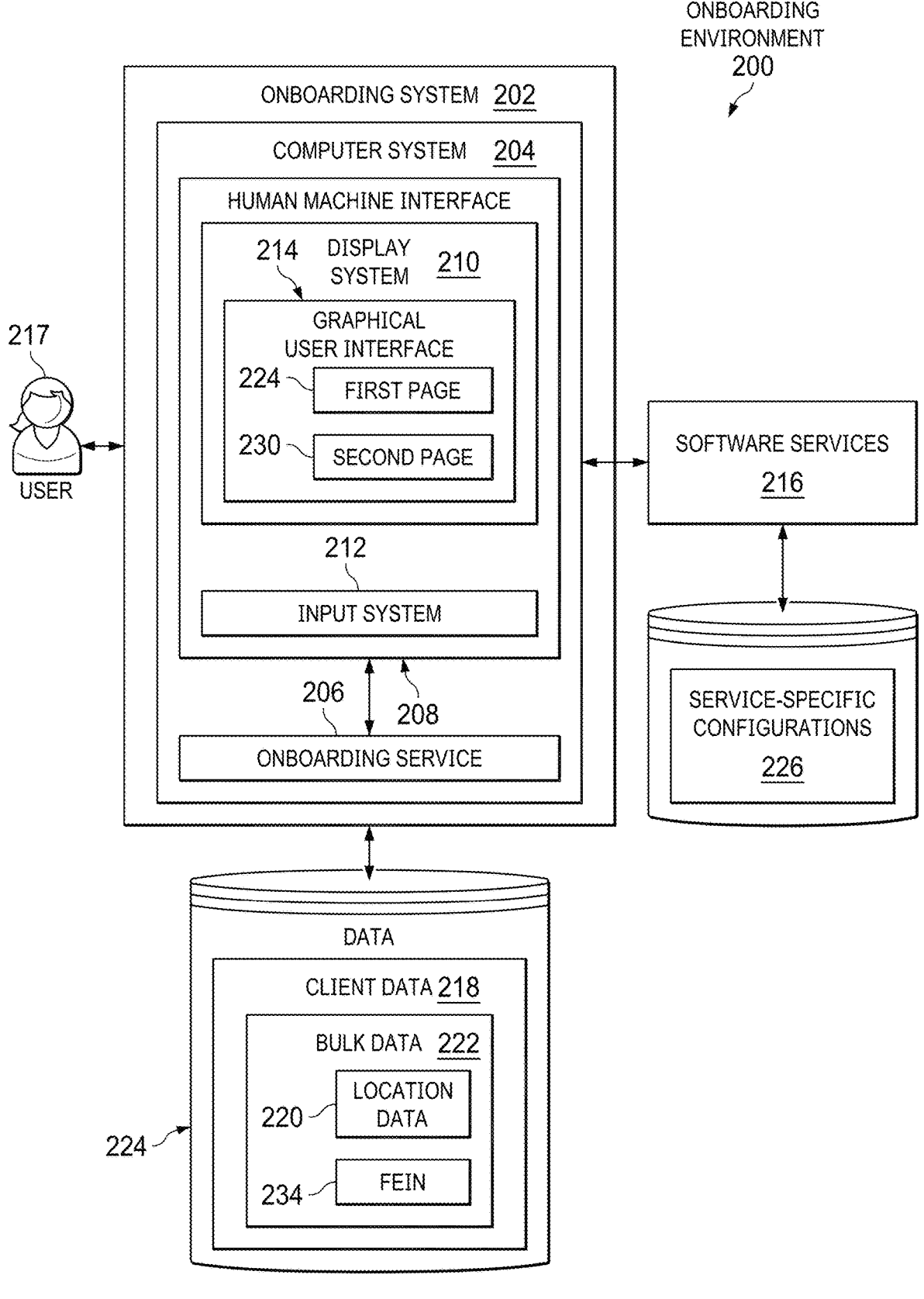
FIG. 2 is a block diagram of an onboarding environment in accordance with an illustrative embodiment.

With reference now to FIG. 2, a block diagram of an application environment is depicted in accordance with an illustrative embodiment. In this illustrative example, application environment 200 includes components that can be implemented in hardware such as the hardware shown in network data processing system 100 in FIG. 1.

In this illustrative example, onboarding system 202 is an example of onboarding service 130 of FIG. 1. onboarding system 202 in application environment 200 can provide for the faster collection of client information while also reducing errors in data entry. onboarding system 202 provides a graphical user interface with specific structure and concordant functionality that eliminates repetitive entry of identical client data across multiple services and enables a client to onboard software services more quickly across multiple client locations.

As a result, the illustrative examples display client information in a more organized manner that is easier to input and review. onboarding system 202 enables clients to onboard services more quickly and accurately. By making the onboarding process easier, graphical user interface 214 reduces client no-starts in an onboarding environment.

As depicted, onboarding system 202 comprises computer system 204 and onboarding service 206. onboarding service 206 runs in computer system 204. onboarding service 206 can be implemented in software, hardware, firmware, or a combination thereof. When software is used, the operations performed by onboarding service 206 can be implemented in program code configured to run on hardware, such as a processor unit. When firmware is used, the operations performed by onboarding service 206 can be implemented in program code and data and stored in persistent memory to run on a processor unit. When hardware is employed, the hardware may include circuits that operate to perform the operations in onboarding service 206.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, human machine interface 208 comprises display system 210 and input system 212. Display system 210 is a physical hardware system and includes one or more display devices on which graphical user interface 214 can be displayed. The display devices can include at least one of a light emitting diode (LED) display, a liquid crystal display (LCD), an organic light emitting diode (OLED) display, a computer monitor, a projector, a flat panel display, a heads-up display (HUD), or some other suitable device that can output information for the visual presentation of information.

In this illustrative example, human machine interface 208 can enable user 217 to interact with one or more computers or other types of computing devices in computer system 204. For example, these computing devices can be client devices such as client devices 110 in FIG. 1. User 217 is a person that can interact with graphical user interface 214 through user input generated by input system 212 for computer system 204. Input system 212 is a physical hardware system and can be selected from at least one of a mouse, a keyboard, a trackball, a touchscreen, a stylus, a motion sensing input device, a gesture detection device, a cyber glove, or some other suitable type of input device.

In one or more illustrative embodiments, graphical user interface 214 solves problems of prior graphical user interface devices (GUIs), in the context of onboarding client data 218 for software services 216, relating to speed, accuracy, and usability. Rather than reciting a mathematical algorithm, a fundamental economic or longstanding commercial practice, or a challenge in business, graphical user interface 214 improves on existing graphical user interface devices that do not have a pre-electronic onboarding analog. The embodiments of graphical user interface 214 provide significantly more than prior graphical user interface devices that merely allow for setting, displaying, and selecting data or information that is visible on a graphical user interface device. Instead, graphical user interface 214 utilizes a specific, structured interface directly related a prescribed functionality that resolves a specifically identified problem of collecting client data 218 in the context of onboarding a client for software services 216.

Furthermore, the specific structure and concordant functionality of graphical user interface 214 distinguishes onboarding system 202 as compared to conventional computer implementations of known procedures. The function of graphical user interface 214 is not simply the generalized use of computer system 204 as a tool to conduct a known or obvious process. Instead, graphical user interface 214 provides an inventive concept that allows for the faster collection of client data 218 while also reducing errors in data entry. By displaying client data 218 in a more organized manner that is easier to input and review, graphical user interface 214 enables clients to onboard software services 216 more quickly and accurately. By making the onboarding process easier, graphical user interface 214 reduces client no-starts. Rather than the routine or conventional use of computers or the Internet, graphical user interface 214 overcomes problems that are necessarily rooted in computer technology and that specifically arise in the realm of computer networks, resulting in an improvement to the capabilities of onboarding system 202.

In this illustrative example, onboarding service 206, operating in conjunction with graphical user interface 214, is configured to onboard client data 218 for provisioning software services 216. Graphical user interface 214 enables a client to onboard software services 216 more quickly by eliminating repetitive entry of identical client data across multiple software services 216. For example, Graphical user interface 214 eliminates entry of FEIN data for each client location.

Software services 216 may be provided to clients as part of a suite of Internet-provided services. For example, software services 216 may include an employee benefits service, a software service, a timekeeping service, a paycard service, a retirement planning service, as well as other human resources services including tax compliance, tax credit, service organization structure, recruitment, training, and other suitable functions relating to the management of employees and organizations.

In this illustrative example, location data 220 for the multiple software services 216 is received in a consolidated manner on first page 224 of the graphical user interface. As used herein, the term "consolidated" means that the multiple software services make use of the same entries of client location data, without the need to repeat across the different software services. For example, location data 220 can be received in a consolidated manner through user input of bulk data 222 from within a template, the bulk data 222 is then uploaded into onboarding service 206. Because graphical user interface 214 receives location data 220 in a consolidated manner that does not require location data 220 to be repeated for each client location, onboarding service 206 allows a service provider to collect client data 218 faster while preventing errors in data entry.

As used herein, "bulk data" is collection, transfer, or dissemination of large quantities of information, a significant portion of which is not reasonably likely to have any ultimate intelligence or operational value to the recipient, but which is provided to the data recipient for the recipient to identify information of intelligence or operational value within it. For example, "bulk location data" may include client locations, as well as other data.

In one illustrative example, graphical user interface 214 receives the location data 220 input one at a time through the online form. Onboarding service 206 configures each of the multiple software services 216 using a plurality of guided questions, displayed within first page 224 of the graphical user interface 214.

For example, onboarding service 206 configures each of the multiple software services 216 by determining a portion of client data 218 that is specific to each of the multiple software services 216 within the first page 224 of the graphical user interface 214. Onboarding service 206 makes this determination for each client location. Graphical user interface 214 then displays, on a first page 224 of the graphical user interface 214, the portion of client data 218 associated with the corresponding one of software services 216.

Using a plurality of guided questions, onboarding service 206 guides user 217 through configurations for each of software services 216. Both configuration and data entry are performed within the first page 224 off graphical user interface 214. In this manner, graphical user interface 214 displays client data 218 in a more organized manner that is easier to input and review. As part of the configuration process, onboarding service 206 determines what portions of client data 218 are needed per location that is specific to the different software services 216. Graphical user interface 214 selectively display ones of guided questions that are specific to those software services 216 to which the client subscribes.

For example, for each of the multiple software services 216, onboarding service 206 may separately specify service-specific configurations 226 for the locations according to the needs of the software services 216. Service-specific configurations 226 can be separately stored, disconnected from the collection of the location data 2209. Onboarding service 206 may generate these service-specific configurations 226 for each client location, as received in bulk data 222 using graphical user interface 214, according to the needs of software services 216 provided at the particular client location. Onboarding service 206 may utilize the service-specific configurations 226 to determine applicable guided questions for display on first page 224 for a particular one of software services 216. The service-specific configurations 226 may subsequently be used to provide software services 216 to a client at the associated location.

Onboarding service 206 organizes location data 220 per FEIN 234. Graphical user interface 214 displays groups of location data 220, organized per FEIN 234, on a second page 230 of the graphical user interface 214. Second page 230 of Graphical user interface 214 displays client data 218 in a more organized manner that is easier to input and review, providing an easier onboarding process that reduces no-starts of software services 216 and enables user 217 to onboard software services 216 more quickly and accurately.

In one illustrative example, one or more solutions are present that overcome a problem with onboarding information for provisioning software services 216. As a result, one or more illustrative examples may provide a graphical user interface that displays client data 218 in a more organized manner. The graphical user interface enables an easier input and review of client data 218 across multiple software services 216, allowing a service provider to collect client data 218 faster while preventing errors in data entry.

Computer system 204 can be configured to perform at least one of the steps, operations, or actions described in the different illustrative examples using software, hardware, firmware, or a combination thereof. As a result, computer system 204 operates as a special purpose computer system in onboarding service 206 in computer system 204. In particular, onboarding service 206 transforms computer system 204 into a special purpose computer system as compared to currently available general computer systems that do not have onboarding service 206. In this example, computer system 204 operates as a tool that can increase at least one of speed, accuracy, or usability of computer system 204, as compared with using current onboarding systems.

The illustration of application environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Turning now to FIGS. 3-4, illustrations of a graphical user interface for onboarding client data 218 for provisioning multiple software services are shown in accordance with an illustrative embodiment. The illustrations of graphical user interface in FIGS. 3-4 are provided as one illustrative example of an implementation for onboarding client information for provisioning multiple software services and are not meant to limit the manner in which graphical user interface can be generated and presented in other illustrative examples.

With reference to FIG. 3, a first page of a graphical user interface is depicted in which an onboarding service is depicted in accordance with an illustrative embodiment. As depicted, graphical user interface 300 is an example one implementation for graphical user interface 126 in FIG. 1 and first page 224 of graphical user interface 214 in FIG. 2.

In first page 224, a user can choose to enter location data in bulk within a template provided, and upload it into the new onboarding experience, collecting client location data for software services in a consolidated manner. Alternatively, the user can choose to manually input location information one at a time through the online form.

first page 224 guides users through configuration for each of the services within the same page as entering the location data. first page 224 indicates what information is needed on a per location basis, as well as what information is specific to each of these software services to which a client may be subscribed.

With reference to FIG. 4, a second page of a graphical user interface is depicted in which an onboarding service is depicted in accordance with an illustrative embodiment. As depicted, second page 410 of graphical user interface 300 is an example of one implementation for graphical user interface 126 in FIG. 1 and second page 230 of graphical user interface 214 in FIG. 2.

Client locations are organized per FEIN. Second page 230 displays Client locations as groups within each FEIN. Using second page 230, the user does not need to repeat entry of FEIN data for each client location, enabling the user to onboard software services more quickly and accurately.

Figures 5, 6:
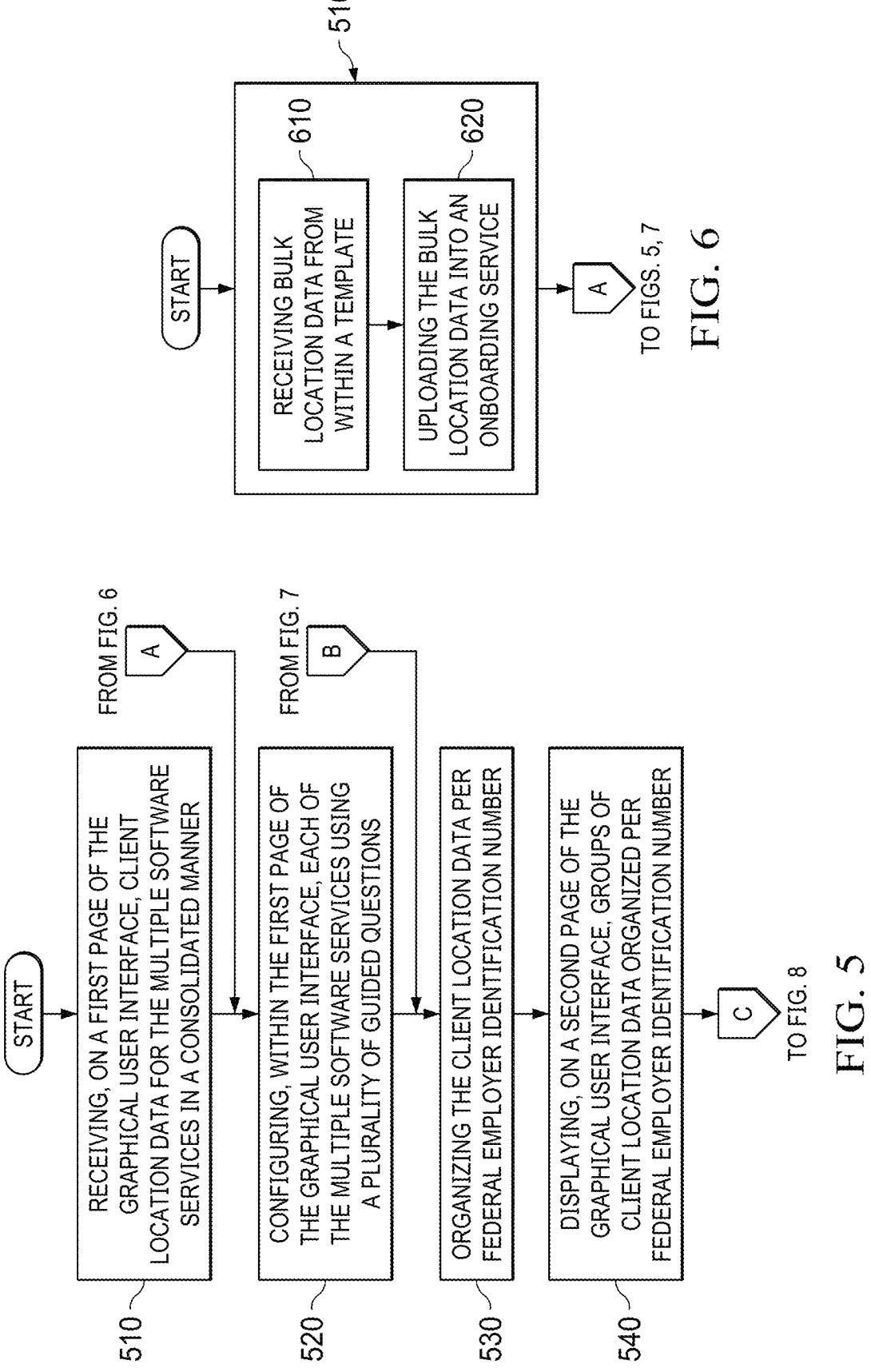
FIG. 5, a flowchart of a process for onboarding client information for provisioning multiple software services is depicted in accordance with an illustrative embodiment.
FIG. 6, a flowchart of a process for receiving the client location data is depicted in accordance with an illustrative embodiment.

Turning next to FIG. 5, a flowchart of a process for onboarding client information for provisioning multiple software services is depicted in accordance with an illustrative embodiment. The process in FIG. 5 can be implemented in hardware, software, or both. When implemented in software, the process can take the form of program code that is run by one or more processor units located in one or more hardware devices in one or more computer systems. For example, the process can be implemented in onboarding service 206 in computer system 204 in FIG. 2.

On a first page of the graphical user interface, the process receives client location data for the multiple software services in a consolidated manner (step 510). Within the first page of the graphical user interface, each of the multiple software services is configured using a plurality of guided questions (step 520). Both configuration and data entry are performed within the first page, graphical user interface displays client information in a more organized manner that is easier to input and review.

The process organizes the client location data per FEIN (step 530), and displays groups of client location data, organized per FEIN, on a second page of the graphical user interface (step 540). The specific structure of the graphical user interface provides an easier onboarding process that reduces no-starts and enables a client to onboard services more quickly and accurately. The process terminates thereafter.

With reference next to FIG. 6, a flowchart of a process for receiving the client location data is depicted in accordance with an illustrative embodiment. The process in FIG. 6 is an example one implementation for step 510 in FIG. 5.

The process receives bulk location data from within a template (step 610). The process uploads the bulk location data into an onboarding service (step 620). The process continues to step 520 of FIG. 5 thereafter.

With reference next to FIG. 7, a flowchart of a process for configuring multiple software services is depicted in accordance with an illustrative embodiment. The process in FIG. 7 is an example one implementation for step 520 in FIG. 5.

For each client location, the process determines a portion of the information that is specific to each of the multiple software services (step 710). The process displays the portion of the information associated with the corresponding software service on a first page of the graphical user interface (step 720). The process continues to step 530 of FIG. 5 thereafter.

With reference next to FIG. 8, a flowchart of a process for providing the software services is depicted in accordance with an illustrative embodiment. The process in FIG. 8 can be implemented in conjunction with the process of FIG. 5.

Continuing from step 540, for each of the multiple software services, the process separately specifies service-specific configurations for the locations according to the needs of the software services, disconnected from the collection of the location data (step 810).

Based on the client location data, the process generates a service-specific profile for each location according to the needs of the software services provided at that location open parentheses step 820). Software services are provided according to the service-specific profile (step 830). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 9:
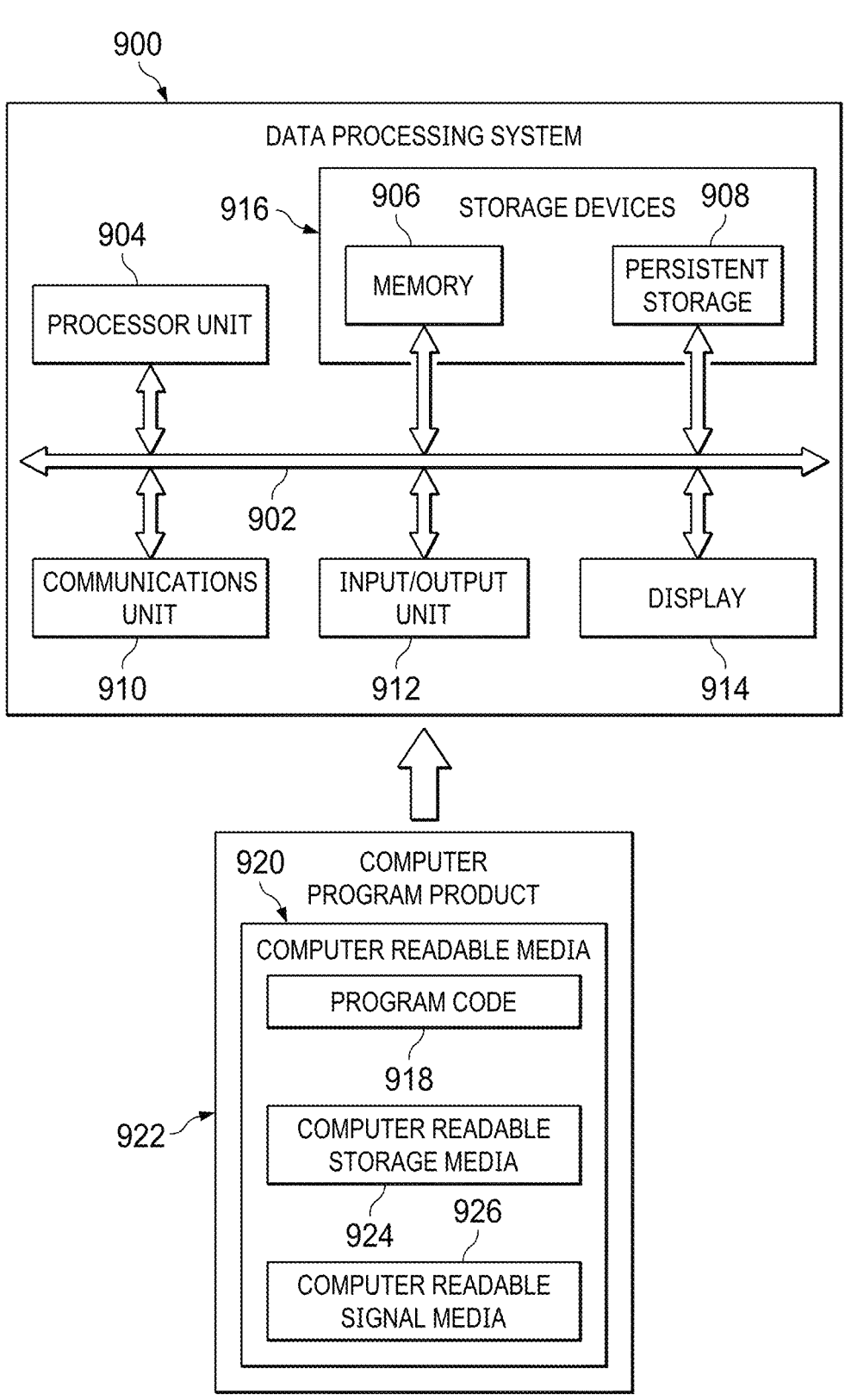
FIG. 9 is a block diagram of a data processing system in accordance with an illustrative embodiment.

Turning now to FIG. 9, a block diagram of a data processing system is depicted in accordance with an illustrative embodiment. Data processing system 900 can be used to implement server computer 104, server computer 106, client devices 110, in FIG. 1. Data processing system 900 can also be used to implement computer system 204 in FIG. 2. In this illustrative example, data processing system 900 includes communications framework 902, which provides communications between processor unit 904, memory 906, persistent storage 908, communications unit 910, input/output (I/O) unit 912, and display 914. In this example, communications framework 902 takes the form of a bus system.

Processor unit 904 serves to execute instructions for software that can be loaded into memory 906. Processor unit 904 includes one or more processors. For example, processor unit 904 can be selected from at least one of a multicore processor, a central processing unit (CPU), a graphics processing unit (GPU), a physics processing unit (PPU), a digital signal processor (DSP), a network processor, or some other suitable type of processor. Further, processor unit 904 can may be implemented using one or more heterogeneous processor systems in which a main processor is present with secondary processors on a single chip. As another illustrative example, processor unit 904 can be a symmetric multi-processor system containing multiple processors of the same type on a single chip.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 906, in these examples, can be, for example, a random-access memory or any other suitable volatile or non-volatile storage device. Persistent storage 908 may take various forms, depending on the particular implementation.

For example, persistent storage 908 may contain one or more components or devices. For example, persistent storage 908 can be a hard drive, a solid-state drive (SSD), a flash memory, a rewritable optical disk, a rewritable magnetic tape, or some combination of the above. The media used by persistent storage 908 also can be removable. For example, a removable hard drive can be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that can be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs can be located in storage devices 916, which are in communication with processor unit 904 through communications framework 902. The processes of the different embodiments can be performed by processor unit 904 using computer-implemented instructions, which may be located in a memory, such as memory 906.

These instructions are program instructions and are also referred to as program code, computer usable program code, or computer-readable program code that can be read and executed by a processor in processor unit 904. The program code in the different embodiments can be embodied on different physical or computer-readable storage media, such as memory 906 or persistent storage 908.

Program code 918 is located in a functional form on computer-readable media 920 that is selectively removable and can be loaded onto or transferred to data processing system 900 for execution by processor unit 904. Program code 918 and computer-readable media 920 form computer program product 922 in these illustrative examples. In the illustrative example, computer-readable media 920 is computer-readable storage media 924.

In these illustrative examples, computer-readable storage media 924 is a physical or tangible storage device used to store program code 918 rather than a medium that propagates or transmits program code 918. Computer-readable storage media 924, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. The term "non-transitory" or "tangible", as used herein, is a limitation of the medium itself (i.e., tangible, not a signal) as opposed to a limitation on data storage persistency (e.g., RAM vs. ROM).

Alternatively, program code 918 can be transferred to data processing system 900 using a computer-readable signal media. The computer-readable signal media are signals and can be, for example, a propagated data signal containing program code 918. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 920" can be singular or plural. For example, program code 918 can be located in computer-readable media 920 in the form of a single storage device or system. In another example, program code 918 can be located in computer-readable media 920 that is distributed in multiple data processing systems. In other words, some instructions in program code 918 can be located in one data processing system while other instructions in program code 918 can be located in one data processing system. For example, a portion of program code 918 can be located in computer-readable media 920 in a server computer while another portion of program code 918 can be located in computer-readable media 920 located in a set of client computers.

The different components illustrated for data processing system 900 are not meant to provide architectural limitations to the manner in which different embodiments can be implemented. In some illustrative examples, one or more of the components may be incorporated in or otherwise form a portion of, another component. For example, memory 906, or portions thereof, may be incorporated in processor unit 904 in some illustrative examples. The different illustrative embodiments can be implemented in a data processing system including components in addition to or in place of those illustrated for data processing system 900. Other components shown in FIG. 9 can be varied from the illustrative examples shown. The different embodiments can be implemented using any hardware device or system capable of running program code 918.

Thus, the illustrative embodiments of the present invention provide a computer-implemented method, computer system, and computer program product for onboarding client information for provisioning multiple software services. The computer system includes a hardware processor, an onboarding service, and a graphical user interface. The onboarding service receives client location data for the multiple software services in a consolidated manner from a first page of the graphical user interface. The onboarding service displays a plurality of guided questions within the first page of the graphical user interface, and configures each of the multiple software services according to client location data received in response to the guided questions. The onboarding service organizes the client location data per FEIN, and displays groups of client location data, organized per FEIN, on a second page of the graphical user interface, providing an easier onboarding process that reduces no-starts and enables a client to onboard services more quickly and accurately.

The illustrative examples can be used to onboard client information for provisioning software services. Graphical user interface 214 enables a client to onboard software services more quickly by eliminating repetitious entry of identical client data across multiple services. For example, Graphical user interface 214 eliminates entry of FEIN data for each client location.

As a result, the illustrative examples can provide for the faster collection of client information while also reducing errors in data entry. By displaying client information in a more organized manner that is easier to input and review, graphical user interface 214 enables clients to onboard services more quickly and accurately. By making the onboarding process easier, graphical user interface 214 reduces client no-starts. Rather than the routine or conventional use of computers or the Internet, graphical user interface 214 overcomes problems that are necessarily rooted in computer technology and that specifically arise in the realm of computer networks, resulting in an improvement to the capabilities of onboarding system 202.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer system comprising:
one or more processors, coupled with memory, to:
store, in a data structure, client location data for computing services, wherein the client location data is organized in the data structure according to an identification number of a client;
receive, via one or more interfaces, one or more entries in response to a plurality of inquiries, the plurality of inquiries determined based on (i) a respective configuration for each of the computing services and (ii) a subset of the client location data associated with the computing services;
configure each of the computing services using the one or more entries; and
transmit, for display via the one or more interfaces subsequent to configuration of each of the computing services, the subset of the client location data associated with the configured computing services.

2. The computer system of claim 1, wherein the identification number of the client is Federal Employer Identification Number.

3. The computer system of claim 1, wherein to receive the client location data, the one or more processors further:
receive bulk location data from within a template; and
store the bulk location data in the memory.

4. The computer system of claim 1, wherein to receive the client location data, the one or more processors further:
receive location data input one at a time through an online form.

5. The computer system of claim 1, wherein to configure each of the computing services, the one or more processors further:
for each client location, determine the subset of the client location data that is specific to each of the computing services; and
provide, for display via the interface, the subset of the client location data associated with a corresponding computing service.

6. The computer system of claim 1, wherein:
the one or more interfaces comprise a graphical user interface, and to receive the one or more entries, the one or more processors further:
display, via a first portion of the graphical user interface, the plurality of inquiries and the subset of the client location data associated with a corresponding computing service of the computing services; and
receive, via the first portion, the one or more entries in response to the plurality of inquiries, and wherein to provide the subset of the client location data, the one or more processors further:

display, via a second portion of the graphical user interface, the subset of the client location data associated with the configured computing services.

7. The computer system of claim 1, wherein the one or more processors further:

for each of the computing services, specify separately service-specific configurations for locations according to needs of the computing services, disconnected from a collection of the client location data;

generate, based on the client location data, a service-specific profile for each location according to the needs of the computing services provided at that location; and provide the computing services according to the service-specific profile.

8. The computer system of claim 1, wherein the computing services comprise at least one of a paycard service or a tax credit service.

9. The computer system of claim 1, wherein the one or more processors further:

improve, based on the configuration of each of the computing services using the one or more entries, performance related to the computing services by reducing repetitious input of the identification number through the one or more interfaces.

10. A method, comprising:

storing, by one or more processors, coupled with memory, in a data structure, client location data for computing services, wherein the client location data is organized in the data structure according to an identification number of a client;

receiving, by the one or more processors via one or more interfaces, one or more entries in response to a plurality of inquiries, the plurality of inquiries determined based on (i) a respective configuration for each of the computing services and (ii) a subset of the client location data associated with the computing services;

configuring, by the one or more processors, each of the computing services using the one or more entries; and transmitting, by the one or more processors for display via the one or more interfaces subsequent to configuration of each of the computing services, the subset of the client location data associated with the configured computing services.

11. The method of claim 10, wherein the identification number of the client is a Federal Employer Identification Number.

12. The method of claim 10, wherein receiving the client location data comprises:

receiving, by the one or more processors, bulk location data from within a template; and storing, by the one or more processors, the bulk location data in a memory.

13. The method of claim 10, wherein receiving the client location data comprises:

receiving, by the one or more processors, location data input one at a time through an online form.

14. The method of claim 10, wherein configuring each of the computing services comprises:

for each client location, determining, by the one or more processors, the subset of the client location data that is specific to each of the computing services; and providing, by the one or more processors for display via the one or more interfaces, the subset of the client location data associated with a corresponding computing service.

15. The method of claim 10, wherein:

the one or more interfaces comprises a graphical user interface, and receiving the one or more entries comprises:

displaying, by the one or more processors via a first portion of the graphical user interface, the plurality of inquiries and the subset of the client location data associated with a corresponding computing service of the computing services; and receiving, by the one or more processors via the first portion, the one or more entries in response to the plurality of inquiries, and wherein providing the subset of the client location data, comprises:

displaying, by the one or more processors via a second portion of the graphical user interface, the subset of the client location data associated with the configured computing services.

16. A computer program product comprising a computer readable storage media, and program code, stored on the computer readable storage media, for:

storing, in a data structure, client location data for computing services, wherein the client location data is organized in the data structure according to an identification number of a client;

receiving, via an interface, one or more entries in response to a plurality of inquiries, the plurality of inquiries determined based on (i) a respective configuration for each of the computing services and (ii) a subset of the client location data associated with the computing services;

configuring each of the computing services using the one or more entries; and transmitting, for display subsequent to configuration of each of the computing services, the subset of the client location data associated with the configured computing services.

17. The computer program product of claim 16, wherein the program code is for:

for each of the computing services, specifying separately service-specific configurations for locations according to needs of the computing services, disconnected from a collection of the client location data;

generating, based on the client location data, a service-specific profile for each location according to the needs of the computing services provided at that location; and providing the computing services according to the service-specific profile.

18. The computer program product of claim 16, wherein the computing services comprise at least one of a paycard service or a tax credit service.

\* \* \* \* \*